United States Patent
Chu (10) Patent No.: US 11,370,045 B2
(45) Date of Patent: Jun. 28, 2022

(54) WIRE ELECTRICAL DISCHARGE MACHINE AND ELECTRICAL DISCHARGE MACHINING METHOD

(71) Applicant: FANUC CORPORATION, Yamanashi (JP)

(72) Inventor: Fuchen Chu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 471 days.

(21) Appl. No.: 16/391,823

(22) Filed: Apr. 23, 2019

(65) Prior Publication Data

US 2019/0329342 A1    Oct. 31, 2019

(30) Foreign Application Priority Data

Apr. 25, 2018    (JP) .............................. JP2018-083627

(51) Int. Cl.
     *B23H 7/04*        (2006.01)
     *B23H 1/02*        (2006.01)

(52) U.S. Cl.
     CPC .................. *B23H 7/04* (2013.01); *B23H 1/02* (2013.01)

(58) Field of Classification Search
CPC . B23H 7/04; B23H 1/022; B23H 1/02; B23H 7/02; B23H 7/18; B23H 7/20; B23H 7/32; B23H 1/026; B23H 11/00; B23H 7/14; B23H 1/024; B23H 7/16; B23H 7/065; B23H 7/10; B23H 7/101; B23H 1/10; B23H 7/30; B23H 7/26; B23H 7/105; B23H 7/102; B23H 7/104; B23H 1/00; B23H 1/04; B23H 1/028; B23H 9/14; B23H 9/10; B23H 1/06; B23H 7/12; B23H 7/06; B23H 7/36; B23H 9/00; B23H 3/02; B23H 7/28; B23H 5/04; B23H 7/08; G05B 19/414; G05B 23/0218; G05B 19/40937;

(Continued)

(56) References Cited

U.S. PATENT DOCUMENTS 3,705,286 A * 12/1972 Kondo ................... B23H 1/024
                                                             219/69.13

FOREIGN PATENT DOCUMENTS

JP        S54088972 A      7/1979
JP        59042218 A *    3/1984           B23H 7/04

(Continued)

OTHER PUBLICATIONS

"Alessandra Caggiano et al., Wire EDM Monitoring for Zero-Defect Manufacturing based on Advanced Sensor Signal Processing, 2015, Procedia CIRP, vol. 33, pp. 315-320" (Year: 2015).*

(Continued)

*Primary Examiner* — Joel M Attey
*Assistant Examiner* — Rachel R Rizzo
(74) *Attorney, Agent, or Firm* — Fredrikson & Byron, P.A.

(57) ABSTRACT

A wire electrical discharge machine includes: a pulse detection unit configured to detect voltage pulses repeatedly applied between a workpiece and a wire electrode; an instability calculation unit configured to calculate the degree of instability indicating how unstable the discharge state is, by using the number of non-discharge pulses that present no voltage drop due to electrical discharge, among the pulses detected per unit time by a pulse detection unit; and a machining condition changing unit configured to change a machining condition for the workpiece, based on the calculated degree of instability.

15 Claims, 8 Drawing Sheets

(58) Field of Classification Search
CPC .............. G05B 19/4155; G05B 19/182; G05B 19/404; G05B 19/0426; G05B 13/0265; G05B 19/19; G05B 19/188; G05B 19/402; G05B 19/4061; G05B 19/4163; G05B 19/18; G05B 13/021; G05B 13/0275; G05B 19/4093; G05B 19/4141; G05B 19/07; H01J 37/32944; H01J 37/32183; H01J 37/32; H01J 37/32935; H01J 37/34; H01J 37/32082; G06N 20/00; B65H 35/00; B23Q 5/28; B23Q 3/063; B23Q 17/2208; G01R 19/165; G01R 27/28; G01R 31/086; G01R 31/001; G01R 31/085; G01R 31/00; H03K 5/24; H03K 17/601; H02H 1/0015; G01M 17/021; G01N 27/60; G01N 29/38; G01N 29/4436; G01N 29/14; G01N 29/223; G01N 29/0618; G01N 29/4445; B23K 9/173; B23K 9/09; B23K 35/3053; B23K 35/0266; B23K 9/073; B23K 9/0673; B23K 9/10; B23K 9/1735; B23K 9/125; B23K 9/1068; B23K 9/124; B23K 9/121; B23K 9/1043; B23K 9/188; B23K 9/0017; B23K 11/0013; F01D 25/285; G01B 7/281; G01B 7/003; G01B 7/023; C25F 3/06; C25F 1/04; C25F 3/02; C25F 7/02; C25F 1/06; G21F 9/28; G21F 9/004; B21D 45/003; H05K 3/07; H05K 1/0268; H05K 3/02; G06F 13/4072; H05H 1/0093; B01J 19/10; B01J 19/088; G01H 1/00; C22F 3/00; G01Q 60/60; G01Q 30/14; B82Y 35/00; C11D 1/62; H02B 13/065; H04N 17/02; H04N 5/53; F15B 21/08

See application file for complete search history.

(56) References Cited

FOREIGN PATENT DOCUMENTS

| JP | S59042218 A | 3/1984 |
|---|---|---|
| JP | 63102830 A | 5/1988 |
| JP | 539727 B2 | 6/1993 |
| JP | 757447 B2 | 6/1995 |
| JP | 3341494 B2 | 11/2002 |
| JP | 3856603 B2 | 12/2006 |
| JP | 2017042858 A | 3/2017 |
| WO | 8911371 A1 | 11/1989 |

OTHER PUBLICATIONS

H.E. de Bruyn, A.J. Pekelharing, Has the «Delay Time» Influence on the EDM-Process?,CIRP Annals, vol. 31, Issue 1, 1982, pp. 103-106, ISSN 0007-8506, https://doi.org/10.1016/S0007-8506(07)63277-6. (https://www.sciencedirect.com/science/article/pii/S0007850607632776) (Year: 1982).*
English Abstract and Machine Translation for Japanese Publication No. 3341494 B2, published Nov. 5, 2002, 16 pgs.
English Abstract and Machine Translation for Japanese Publication No. 0757447 B2, published Jun. 21, 1995, 9 pgs.
English Abstract and Machine Translation for Japanese Publication No. 3856603 B2, published Dec. 13, 2006, 7 pgs.
English Abstract and Machine Translation for Japanese Publication No. 63-102830 A, published May 7, 1988, 5 pgs.
English Abstract and Machine Translation for Japanese Publication No. 60-238232 A, published Nov. 27, 1985 (which JP 60-238232 A is the Application No. for Japanese Publication No. 5-39727 B2, published Jun. 16, 1993), 5 pgs.
English Machine Translation for Japanese Publication No. JPS54-088972A, published Jul. 14, 1979, 8 pgs.
English Machine Translation for Japanese Publication No. JPS59-042218A, published Mar. 8, 1984, 9 pgs.
English Machine Translation for Japanese Publication No. JP2017-042858A, published Mar. 2, 2017, 10 pgs.
English Abstract and Machine Translation for International Publication No. WO8911371 A1, published Nov. 30, 1989, 19 pgs.
D.F. Dauw et al., "Advanced Pulse Discriminating System for EDM Process Analysis and Control", CIRP Annals—Manufacturing Technology, vol. 32, Issue 2, Jan. 1, 1983, pp. 541-549.
W.M. Lee et al., "Adaptive control of the WEDM process using a self-tuning fuzzy logic algorithm with grey prediction", International Journal of Advanced Manufacturing Technology, vol. 34, Jun. 8, 2006, pp. 527-537.
Cabanes et al., "On-line prevention of wire breakage in wire electro-discharge machining", Robotics and Computer-Integrated Manufacturing, vol. 24, No. 2, Nov. 20, 2007, pp. 287-298.
Partial European Search Report for European Patent Application No. 19170989.8, dated Sep. 10, 2019, 18 pgs.

* cited by examiner

WIRE ELECTRICAL DISCHARGE MACHINE AND ELECTRICAL DISCHARGE MACHINING METHOD

CROSS-REFERENCE TO RELATED APPLICATION

This application is based upon and claims the benefit of priority from Japanese Patent Application No. 2018-083627 filed on Apr. 25, 2018, the contents of which are incorporated herein by reference.

BACKGROUND OF THE INVENTION

Field of the Invention

The present invention relates to a wire electrical discharge machine and an electrical discharge machining method, which apply a voltage between a workpiece to be machined and a wire electrode to generate electrical discharge at an electrode gap formed between the workpiece and the wire electrode and thereby perform electrical discharge machining on the workpiece.

Description of the Related Art

In the wire electrical discharge machine, the wire electrode can break due to various factors such as when the discharge time becomes relatively long, when the voltage application time becomes relatively short, or when the distance between the workpiece and the wire electrode becomes relatively short, etc.

In order to reduce breakage of the wire electrode, a wire electrical discharge machine is disclosed in Japanese Patent No. 3856603, for example. In the wire electrical discharge machine disclosed in Japanese Patent No. 3856603, by taking into consideration the fact that the machining energy at a wire breakage under the abnormal discharge condition is smaller than that under the normal discharge condition, weight coefficients are pre-defined for the normal discharge pulse and the abnormal discharge pulse, which are generated during electrical discharge machining. The numbers of normal discharge pulses and abnormal discharge pulses, generated at the electrode gap, are multiplied by respective coefficients so as to calculate energy evaluation data, which is compared with a threshold. When the calculated energy evaluation data is greater than the threshold, the off time of voltage pulses is increased to thereby reduce wire breakage.

SUMMARY OF THE INVENTION

However, in Japanese Patent No. 3856603, the definitions of the normal discharge state and the abnormal discharge state are unclear. Therefore, an improvement measure for reducing breakage of the wire electrode is needed.

It is therefore an object of the present invention to provide a wire electrical discharge machine and an electrical discharge machining method which can reduce wire electrode breakage.

A first aspect of the present invention resides in a wire electrical discharge machine for performing electrical discharge machining on a workpiece by generating electrical discharge at an electrode gap formed between the workpiece and a wire electrode. The wire electrical discharge machine includes: a pulse detection unit configured to detect pulses of voltage repeatedly applied between the workpiece and the wire electrode; an instability calculation unit configured to calculate the degree of instability indicating how unstable the discharge state is, by using the number of non-discharge pulses that present no voltage drop due to the electrical discharge, among the pulses detected per unit time by the pulse detection unit; and a machining condition changing unit configured to change a machining condition for the workpiece, based on the calculated degree of instability.

A second aspect of the present invention provides an electrical discharge machining method used in a wire electrical discharge machine for performing electrical discharge machining on a workpiece by generating electrical discharge at an electrode gap formed between the workpiece and a wire electrode. The method includes: a pulse detecting step of detecting pulses of voltage repeatedly applied between the workpiece and the wire electrode; an instability calculating step of calculating the degree of instability indicating how unstable the discharge state is, by using the number of non-discharge pulses that present no voltage drop due to the electrical discharge, among the pulses detected per unit time; and a machining condition changing step of changing a machining condition for the workpiece, based on the calculated degree of instability.

According to the present invention, it is possible to reduce breakage of the wire electrode by changing the machining conditions based on the degree of instability calculated using the number of non-discharge pulses.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The wire electrical discharge machine and the electrical discharge machining method according to the present invention will be detailed below by describing preferred embodiments with reference to the accompanying drawings.

Figure 1:
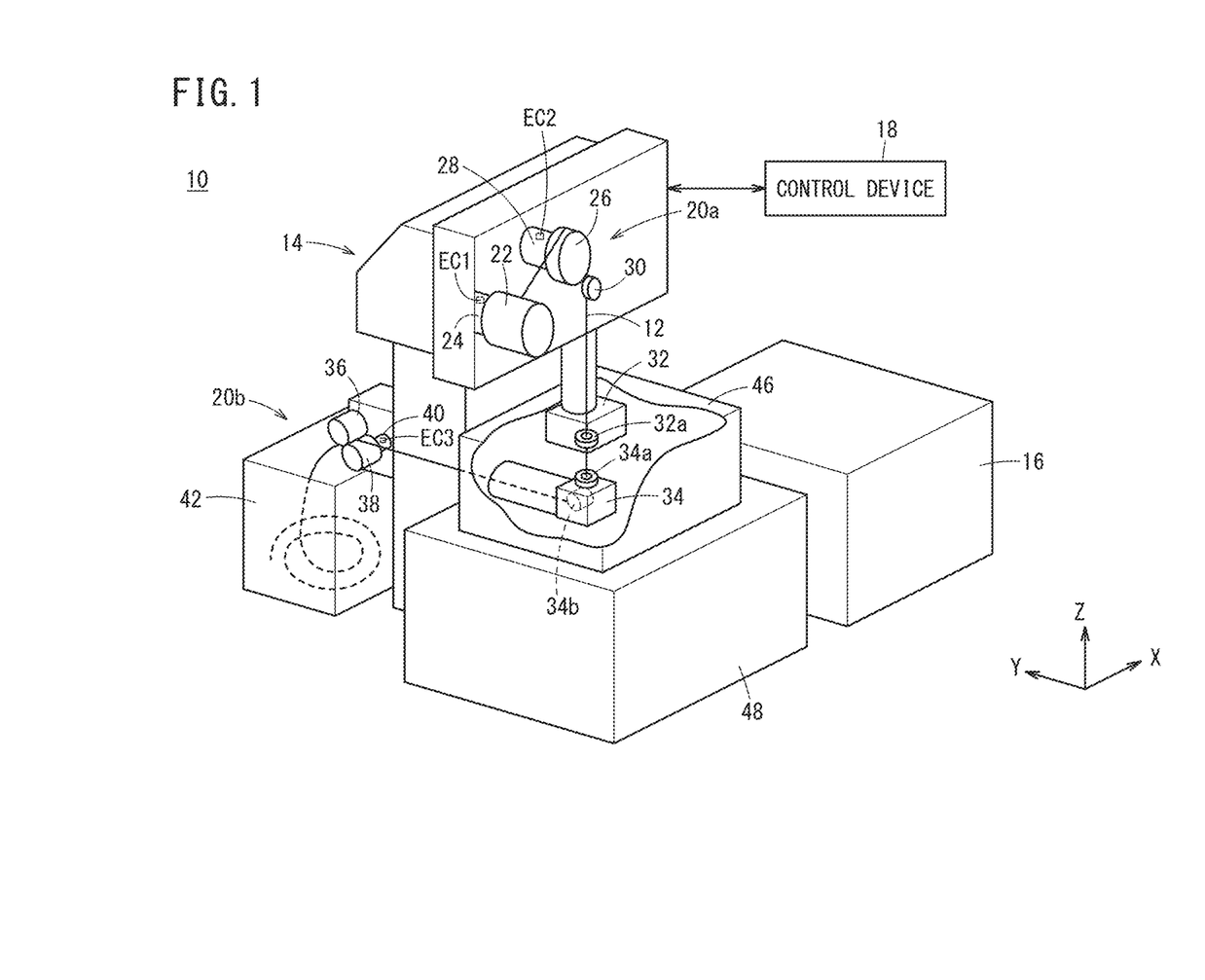
FIG. 1 is a diagram showing an overall schematic configuration of a wire electrical discharge machine according to an embodiment.

FIG. 1 is a diagram showing an overall schematic configuration of a wire electrical discharge machine 10. The wire electrical discharge machine 10 is a machine tool that applies a voltage between a workpiece to be machined and the wire electrode 12 in a dielectric working fluid to generate electric discharge at the electrode gap between the workpiece and the wire electrode 12, thereby performing electrical discharge machining on the workpiece. The wire electrical discharge machine 10 includes a main machining body 14, a dielectric fluid unit 16 and a control device 18.

The wire electrode 12 is formed of, for example, metal material such as tungsten-based, copper-alloy based, brass-based material and the like. On the other hand, the material of the workpiece is a metal material such as, for example, iron-based material, superhard (tungsten carbide) material and the like.

The main machining body 14 includes a supply system 20*a* for supplying the wire electrode 12 toward a target (workpiece, object to be machined), and a collection system 20*b* for collecting the wire electrode 12 that has passed through the workpiece.

The supply system 20*a* includes a wire bobbin 22 on which unused wire electrode 12 is wound, a torque motor 24 for applying torque to the wire bobbin 22, a brake shoe 26 for applying a braking force by friction to the wire electrode 12, a brake motor 28 for applying a brake torque to the brake shoe 26, a tension detection unit 30 for detecting the magnitude of tension of the wire electrode 12, and a wire guide (upper wire guide) 32 located above the workpiece to guide the wire electrode 12. The torque motor 24 and the brake motor 28 are provided with encoders EC1 and EC2 for detecting rotational positions or rotational speeds. The control device 18, based on the detection signals detected by the encoders EC1 and EC2, performs feedback control of the torque motor 24 and the brake motor 28 so as to keep the rotational speeds of the torque motor 24 and the brake motor 28 at predetermined values for rotational speed.

The collection system 20*b* includes a wire guide (lower wire guide) 34 disposed under the workpiece to guide the wire electrode 12, a pinch roller 36 and a feed roller 38 capable of holding the wire electrode 12 therebetween, a torque motor 40 for applying a torque to the feed roller 38, and a collection box 42 for collecting the used wire electrode 12 conveyed by the pinch roller 36 and the feed roller 38. The torque motor 40 is provided with an encoder EC3 for detecting a rotational position or a rotational speed. The control device 18, based on the detection signal detected by the encoder EC3, performs feedback control of the torque motor 40 so as to keep the rotational speed of the torque motor 40 at a predetermined value for rotational speed.

The main machining body 14 includes a work pan 46 capable of storing a dielectric working fluid such as deionized water or oil used in the electrical discharge machining. The work pan 46 is disposed on a base 48. The wire guides 32 and 34 are disposed inside the work pan 46, and a workpiece is set between the wire guides 32 and 34. The wire guides 32 and 34 have respective die guides 32*a* and 34*a* that support the wire electrode 12. The wire guide 34 further includes a guide roller 34*b* that deflects and guides the wire electrode 12 toward the pinch roller 36 and the feed roller 38.

The wire guide 32 ejects clean working fluid free from sludge (machined waste), toward the electrode gap between the wire electrode 12 and the workpiece. This makes it possible to fill the gap with the clean working fluid suitable for electrical discharge machining, and hence prevent accuracy deterioration of electrical discharge machining due to sludge generated during electrical discharge machining. The wire guide 34 may also eject clean fluid free from sludge, toward the gap.

The workpiece is supported on a table (not shown) movable in the X- and Y-directions. The wire guides 32, 34, the workpiece and the table are immersed in the working fluid stored in the work pan 46.

Here, the workpiece has a start hole or a kerf or machined groove formed therein, which is a start point for electrical discharge machining at which the machining is started. The wire electrode 12 is inserted through the start hole or the kerf to thereby feed the wire electrode 12. The gap between the start hole or the kerf of the workpiece and the wire electrode 12 forms the electrode gap. After the wire electrode 12 is passed through the start hole or the kerf of the workpiece and fed, the wire electrical discharge machine 10, while feeding the wire electrode 12 downward (negative Z-direction) to the workpiece, moves the table (workpiece) on a plane parallel to the XY plane, to thereby machine the workpiece. The wire feeding of the wire electrode 12 means that the wire electrode 12 wound on the wire bobbin 22 is passed through the wire guide 32, the workpiece, and the wire guide 34, and pinched between the pinch roller 36 and the feed roller 38. When the wire electrode 12 is fed, a predetermined tension is applied to the wire electrode 12. The X-direction and the Y-direction are orthogonal to each other, and the direction orthogonal to the XY-plane (horizontal plane) is defined as the Z-direction.

The dielectric fluid unit 16 is a device that removes chips (sludge) arising in the work pan 46 and adjusts the electrical resistivity, temperature and the like to control the liquid quality of the working fluid. The working fluid, whose fluid quality is controlled by the dielectric fluid unit 16, is returned to the work pan 46 again, and this working fluid is ejected from at least the wire guide 32. The control device 18 controls the main machining body 14 and the dielectric fluid unit 16.

Figure 2:
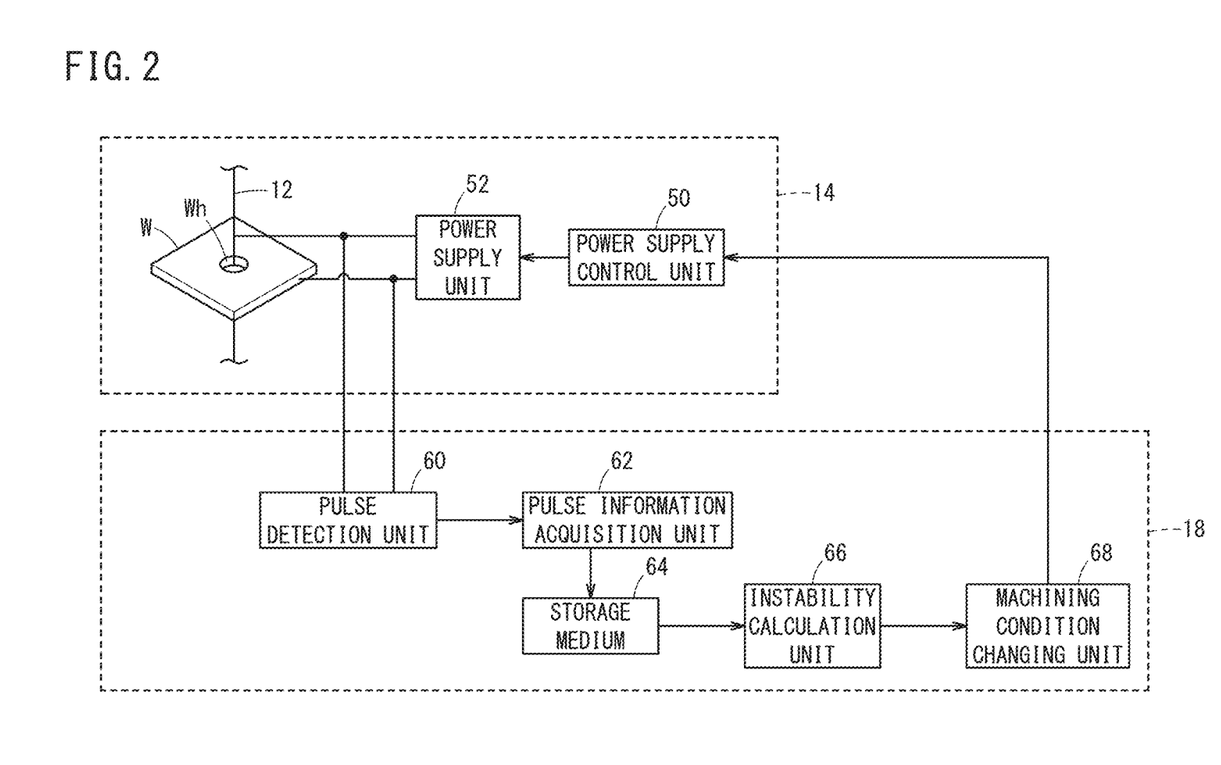
FIG. 2 is a diagram showing a configuration of main components of the wire electrical discharge machine of FIG. 1.

FIG. 2 is a diagram showing a configuration of main components of the wire electrical discharge machine 10. Specifically, in FIG. 2, the main parts of the main machining body 14 and the control device 18 of the wire electrical discharge machine 10 are shown.

The main machining body 14 has a power supply control unit 50 and a power supply unit 52. The control device 18 includes a pulse detection unit 60, a pulse information acquisition unit 62, a storage medium 64, an instability calculation unit 66, and a machining condition changing unit 68.

The power supply control unit 50 controls the power supply unit 52 so that a voltage is repeatedly applied between the workpiece W and the wire electrode 12 at predetermined intervals. That is, the power supply control unit 50, based on information on the workpiece W supplied from the outside, determines the application conditions such as the voltage value, the pulse width, the pulse interval and the like of the pulse of voltage to be applied (hereinafter referred to as the voltage pulse). The pulse interval is a time between the voltage pulses, and is an off time during which no voltage is applied between the workpiece W and the wire electrode 12.

The power supply control unit 50 determines the application conditions, then generates drive pulse signals for driving the power supply unit 52 to apply voltage according to the determined application conditions, and outputs the generated drive pulse signals to the power supply unit 52.

The power supply unit 52, based on the drive pulse signals, repeatedly applies a voltage pulse between the workpiece W and the wire electrode 12 at predetermined intervals. FIG. 2 illustrates a state in which a start hole Wh is formed in the workpiece W and the wire electrode 12 is passed therethrough.

The pulse detection unit 60 detects voltage pulses that are repeatedly applied between the workpiece W and the wire electrode 12. The shapes of the voltage pulses differ depending on the presence or absence of discharge and the timing of occurrence of the discharge.

Figure 3:
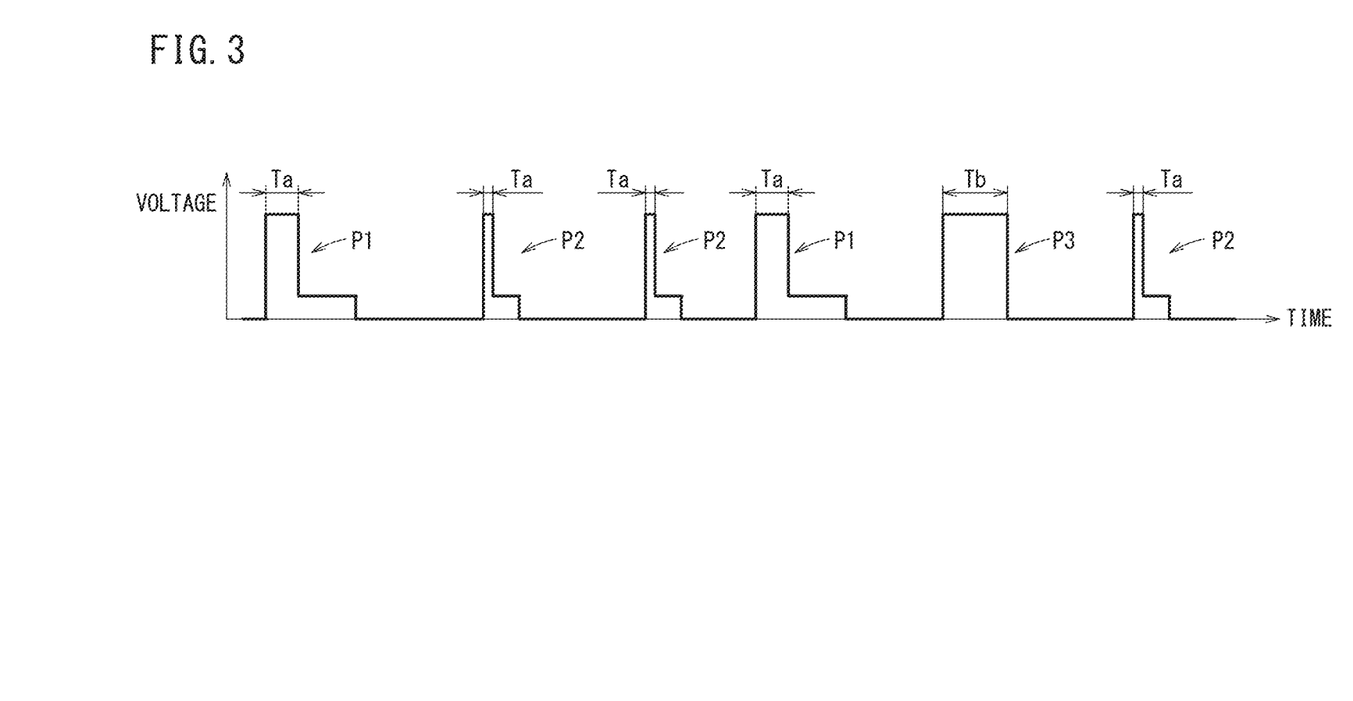
FIG. 3 is a diagram illustrating voltage pulses.

Specifically, as shown in FIG. 3 the voltage pulses include three types, i.e., a normal discharge pulse P1, an abnormal discharge pulse P2 and a non-discharge pulse P3. The normal discharge pulse P1 is a voltage pulse in which a discharge delay time Ta from starting of voltage application until voltage drop due to occurrence of discharge is equal to or greater than a predetermined time. The abnormal discharge pulse P2 is a voltage pulse in which the discharge delay time Ta is less than the predetermined time. The non-discharge pulse P3 is a voltage pulse without voltage drop due to discharge. That is, the pulse time Tb of the non-discharge pulse P3 is a duration time during which the voltage is applied between the workpiece W and the wire electrode 12 (i.e., pulse width of the voltage pulse).

When detecting a voltage pulse, the pulse detection unit 60 performs predetermined signal processing such as shaping processing on the detected voltage pulse, and outputs the voltage pulse obtained as a result of the signal processing to the pulse information acquisition unit 62.

The pulse information acquisition unit 62 acquires pulse information on the voltage pulses detected by the pulse detection unit 60 per unit time. That is, the pulse information acquisition unit 62, based on the pulse width of each voltage pulse supplied from the pulse detection unit 60, determines which type of pulse the voltage pulse belongs to, i.e., normal discharge pulse P1, abnormal discharge pulse P2 or non-discharge pulse P3. In addition, the pulse information acquisition unit 62 counts the number of voltage pulses supplied from the pulse detection unit 60 and measures the time (discharge delay time Ta or pulse time Tb) for each unit time, to obtain the measurement result per unit time as the pulse information.

This pulse information contains the number of normal discharge pulses P1 and the total time of the discharge delay time Ta for the number of pulses P1, the number of abnormal discharge pulses P2 and the total time of the discharge delay time Ta for the number of pulses P2, and the number of non-discharge pulses P3 and the total time of the pulse time Tb for the number of pulses P3. Upon obtaining the pulse information, the pulse information acquisition unit 62 stores the obtained pulse information into the storage medium 64.

The instability calculation unit 66, based on the pulse information stored in the storage medium 64, calculates the degree of instability that indicates how unstable the discharge state is (i.e., the extent of instability of the discharge state), per unit time. The higher the degree of instability, the more unstable the discharge state. That is, the probability that the wire electrode 12 is broken increases as the degree of instability increases.

Now, specific examples of calculation of the degree of instability will be described. For example, when the numbers of normal discharge pulses P1, abnormal discharge pulses P2 and non-discharge pulses P3 are used, the degree of instability can be calculated according to the following formula (1) or (2), for example.

$$IT=(NB+NC)/NA \tag{1}$$

$$IT=(NB+NC)/(NA+NB+NC) \tag{2}$$

In the above formulae (1) and (2), IT is the degree of instability, and NA is the number of normal discharge pulses P1 detected per unit time. Further, in the above formulae (1) and (2), NB is the number of abnormal discharge pulses P2 detected per unit time, and NC is the number of non-discharge pulses P3 detected per unit time. The number of non-discharge pulses P3 may be replaced by a value obtained by multiplying the number of pulses P3 by a coefficient.

The instability calculation unit 66 can calculate the degree of instability based on the above formula (1) or (2) using not only the numbers of normal discharge pulses P1 and abnormal discharge pulses P2 but also the number of non-discharge pulses P3.

As other examples, when the times of the normal discharge pulse P1, the abnormal discharge pulse P2 and the non-discharge pulse P3 are used, the degree of instability can be calculated according to the following formula (3) or (4), for example.

$$IT=(TB+TC)/TA \tag{3}$$

$$IT=(TB+TC)/(TA+TB+TC) \tag{4}$$

In the above formulae (3) and (4), TA is the total time obtained by summing all the discharge delay time Ta of the normal discharge pulses P1 detected per unit time, and TB is the total time obtained by summing all the discharge delay time Ta of the abnormal discharge pulses P2 detected per unit time. TC in the above formulae (3) and (4) is the total time obtained by summing all the pulse time Tb of the non-discharge pulses P3 detected per unit time The instability calculation unit 66 can calculate the degree of instability based on the above formula (3) or (4) using not only the discharge delay time Ta of normal discharge pulses P1 and abnormal discharge pulses P2 but also the pulse time Tb of non-discharge pulses P3.

The pulse time Tb of non-discharge pulses P3 is the duration time during which the voltage is applied between the workpiece W and the wire electrode 12 (i.e., the pulse width of the voltage pulse) as described above, and is thus substantially constant. Therefore, TC is a value obtained by multiplying the pulse width by the number of non-discharge pulses P3. That is, the number of non-discharge pulses P3 is also used in the above formula (3) or (4).

After calculating the degree of instability, the instability calculation unit 66 outputs the calculated degree of instability to the machining condition changing unit 68.

Figure 4:
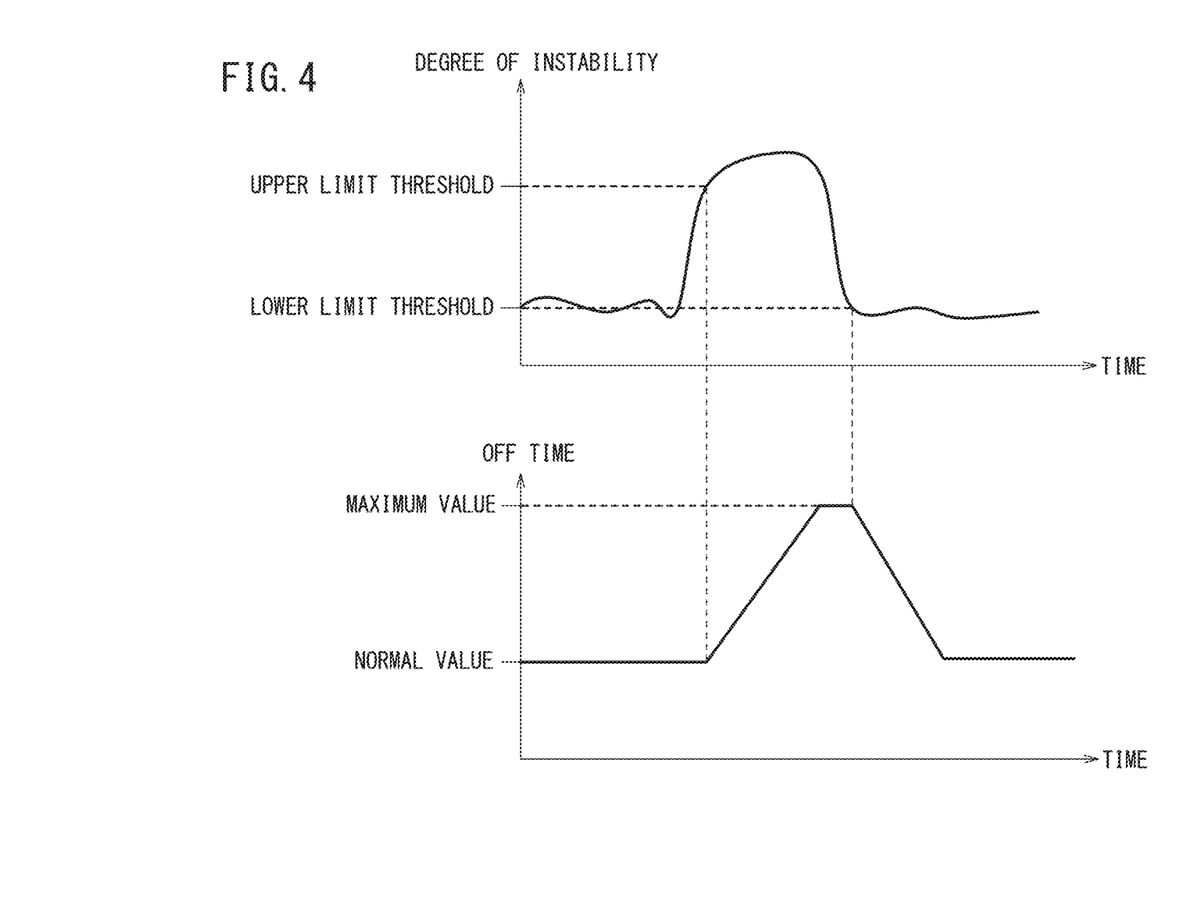
FIG. 4 is a graph showing a relationship between the degree of instability and the off time.

Based on the degree of instability calculated by the instability calculation unit 66, the machining condition changing unit 68 changes the machining conditions for the workpiece. That is, as shown in FIG. 4, the machining condition changing unit 68 compares the degree of instability calculated for each unit time by the instability calculation unit 66 with a predetermined first threshold (upper limit threshold).

Here, when the degree of instability becomes equal to or greater than the first threshold, the machining condition changing unit 68 determines that the discharge state has become unstable, and starts changing the machining conditions. That is, the machining condition changing unit 68 starts changing the machining conditions at the time when the degree of instability reaches the first threshold or greater.

Once the machining condition changing unit 68 starts changing the machining conditions, it changes the off time (the pulse interval between the drive pulse signals), which is one of the application conditions in the power supply control unit 50, every unit time until the degree of instability becomes less than a predetermined second threshold (lower limit threshold) smaller than the first threshold.

Specifically, the machining condition changing unit 68, using a preset proportional constant (change ratio), changes the off time to be longer (i.e., lengthens the off time) in such a manner that the change ratio of the off time to the normal value (initial value) increases as the degree of instability is greater. In this connection, the machining condition changing unit 68 can prevent excessive delay of the electrical discharge machining, by setting a maximum length (maximum limit) for the off time to be changed, in advance.

When the off time (pulse interval between the drive pulse signals) is changed longer (i.e., lengthened), the machining condition changing unit 68 causes the power supply control unit 50 to output drive pulse signals corresponding to the changed off time, to the power supply unit 52. Thereby, breakage of the wire electrode 12 can be diminished.

When the degree of instability becomes less than the second threshold, the machining condition changing unit 68 shortens the off time every unit time until the off time returns to a normal value (initial value). Specifically, the machining condition changing unit 68 shortens the off time (pulse interval) in such a manner that the change ratio of the off time to the normal value (initial value) increases as the degree of instability is greater, and causes the power supply control unit 50 to output drive pulse signals corresponding to the changed off time, to the power supply unit 52. When the off time returns to the normal value (initial value), the machining condition changing unit 68 stops changing the machining conditions until the degree of instability becomes equal to or greater than the first threshold again.

Figure 5:
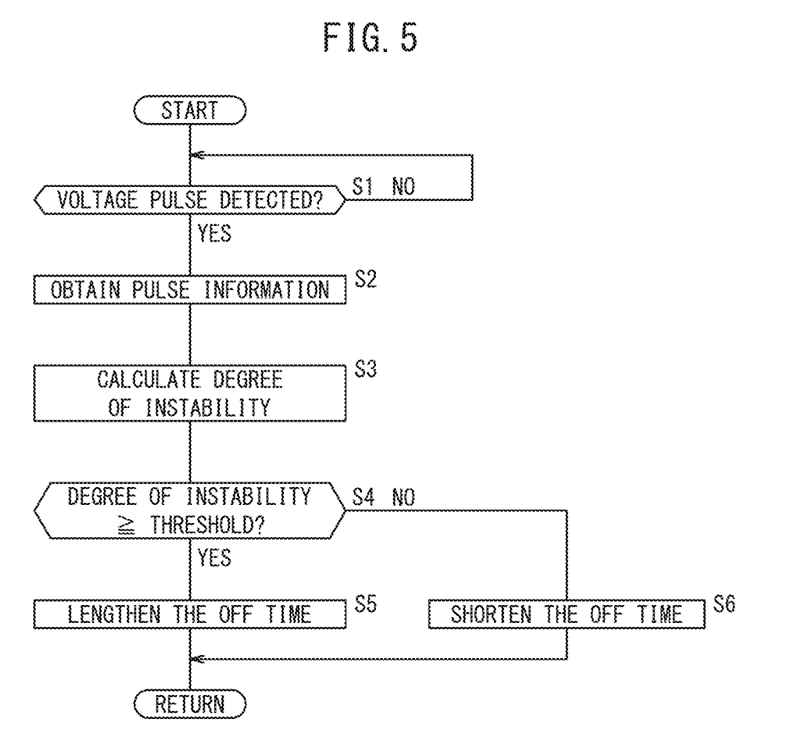
FIG. 5 is a flowchart showing a procedural sequence of a control device at the time of electrical discharge machining.

Next, the electrical discharge machining method of the wire electrical discharge machine 10 will be described. It is assumed herein that voltage pulses are repeatedly applied between the workpiece W and the wire electrode 12 at predetermined intervals. It is also assumed that changing the machining conditions has been started. FIG. 5 is a flowchart showing a control processing sequence of the control device 18.

At step S1, the pulse detection unit 60 monitors the voltage applied between the workpiece W and the wire electrode 12. When the voltage pulse applied from the power supply unit 52 to the workpiece W and the wire electrode 12 is detected, the control proceeds to step S2.

At step S2, the pulse information acquisition unit 62 determines the type of voltage pulse detected at step S1 and measures the number of the voltage pulses and the time concerning the voltage pulses (discharge delay time Ta or pulse time Tb). In addition, upon measuring the number of voltage pulses detected per unit time and the time (discharge delay time Ta or pulse time Tb), the pulse information acquisition unit 62 acquires the measurement result as pulse information, and the control proceeds to step S3.

At step S3, the instability calculation unit 66 calculates the degree of instability based on the pulse information obtained at step S2, and the control proceeds to step S4. The machining condition changing unit 68 compares the degree of instability calculated at step S4 with a predetermined threshold (lower limit threshold).

Here, when the degree of instability is equal to or higher than the predetermined threshold (upper limit threshold), the control proceeds to step S5 where the machining condition changing unit 68 lengthens the off time (pulse interval)) in which no voltage is applied between the workpiece W and the wire electrode 12. That is, the machining condition changing unit 68 changes the off time to be longer in sch a manner that the change ratio of the off time to the normal value (initial value) increases as the degree of instability is greater, and outputs drive pulse signals corresponding to the changes off time (pulse interval), to the power supply unit 52, and then the control returns to step S1.

On the other hand, when the degree of instability is less than the predetermined threshold (upper limit threshold), the matching condition changing unit 68 proceeds to step S6 and shorten the off time (pulse interval). That is, the machining condition changing unit 68 changes the off time (pulse interval) to be shorter in such a manner that the change ratio of the off time to the normal value (initial value) increases as the degree of instability is greater, and outputs drive pulse signals corresponding to the changed off time (pulse interval), to the power supply unit 52, and then the control returns to step S1. When the shortened off time (pulse interval) returns to the normal value (initial value), the machining condition changing unit 68 stops changing of the off time without returning to step S1.

As described heretofore, the control device 18 causes the main machining body 14 to change the off time based on the degree of instability calculated from the pulse information containing the number of non-discharge pulses P3 and the pulse time Tb to thereby diminish breakage of the wire electrode 12.

[Modifications]

Though the above embodiment has been described as one example of the present invention, the technical scope of the invention should not be limited to the above embodiment. It goes without saying that various modifications and improvements can be added to the above embodiment. It is also apparent from the scope of claims that the embodiment added with such modifications and improvements should be incorporated in the technical scope of the invention.

[Modification 1]

Though in the above embodiment, the change of the machining condition (off time) is started at the time when the first threshold (the upper limit threshold) is exceeded, the change of the machining condition (off time) may be started at the time when the second threshold (the lower limit threshold) is reached. That is, only one threshold may be used to determine whether or not to change the machining condition (off time).

Figure 6:
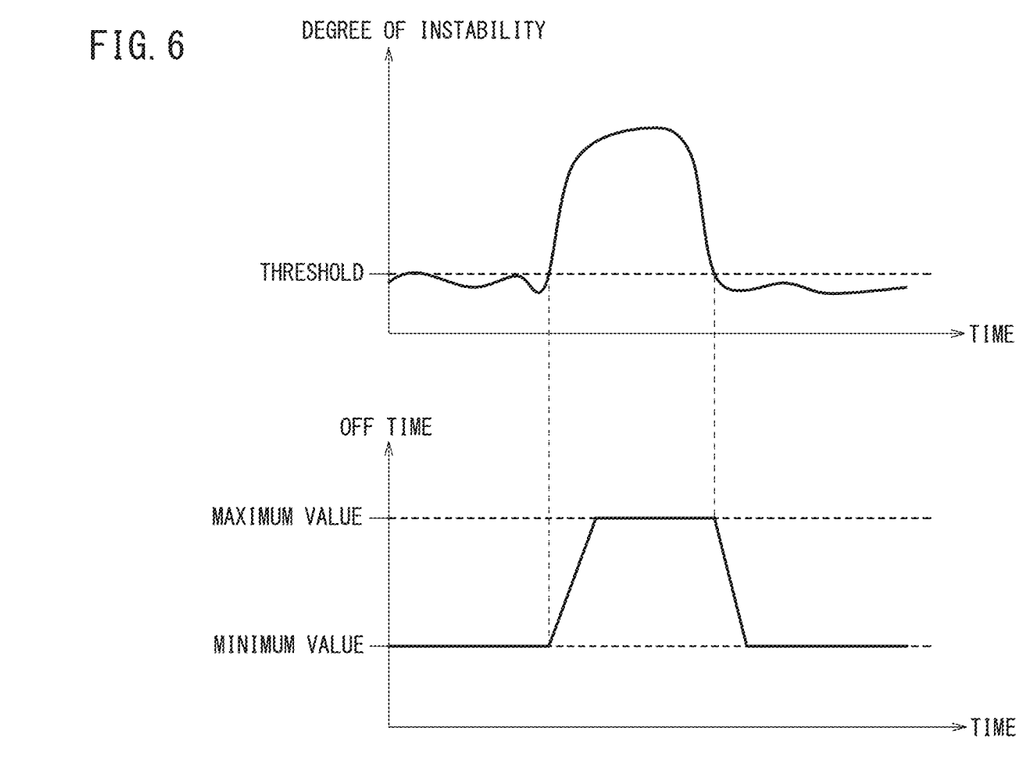
FIG. 6 is a graph showing an example of another relationship between the degree of instability and the off time, different from that of the embodiment.

That is, as shown in FIG. 6, the machining condition changing unit 68 compares the degree of instability calculated for each unit time by the instability calculation unit 66 with a threshold. Here, when the degree of instability is equal to or greater than the threshold, the machining condition changing unit 68, using a prescribed proportional constant (change ratio), lengthens the off time in such a manner that the change ratio of the off time to the normal value (initial value) increases as the degree of instability is greater.

On the other hand, when the degree of instability is less than the threshold, the machining condition changing unit 68 using a prescribed proportional constant (change ratio), shortens the off time in such a manner that the change ratio of the off time to the normal value (initial value) increases as the degree of instability is greater.

In this way, the machining condition changing unit 68 can determine whether or not to change the machining condition (off time), by using one threshold.

In this connection, the machining condition changing unit 68 can prevent excessive delay of the electrical discharge machining, by setting a maximum length (maximum limit) for the off time to be changed, in advance. In addition, the machining condition changing unit 68 can prevent excessive increase of discharge energy, by setting a minimum length (minimum limit) for the off time to be changed, in advance.

[Modification 2]

Though in the above embodiment, the off time is adopted as the machining condition, the flow rate of the working fluid may be adopted.

Figure 7:
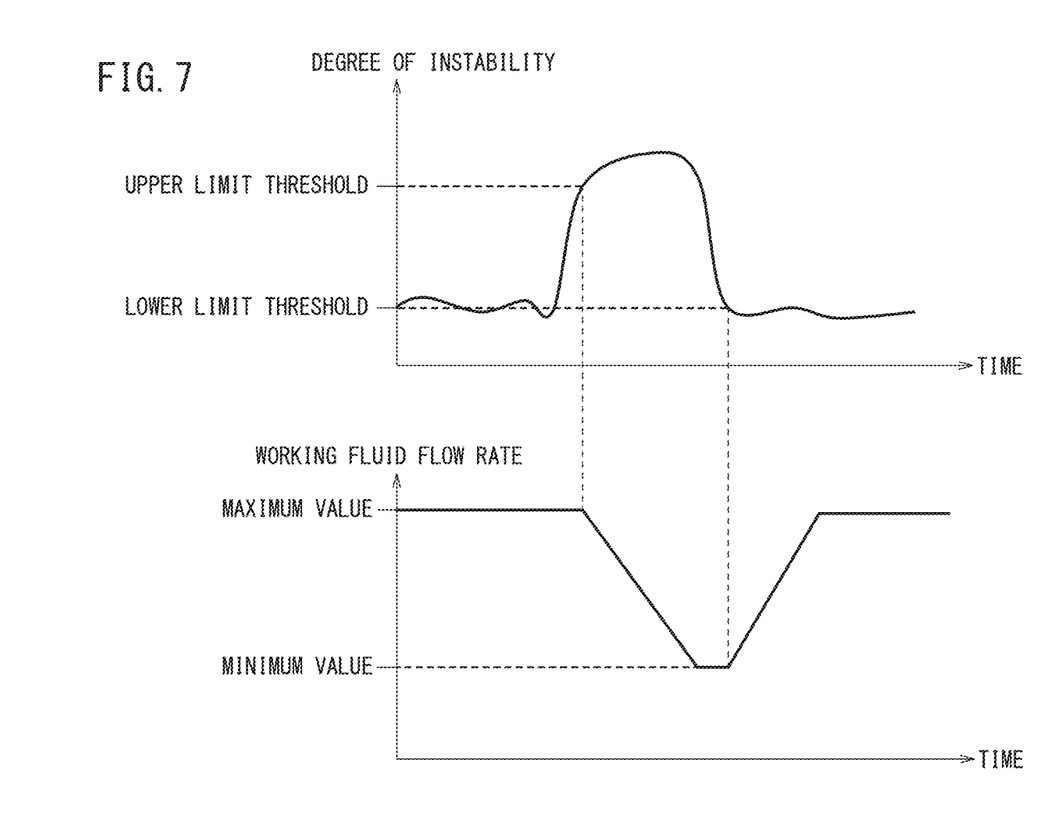
FIG. 7 is a graph showing a relationship between the degree of instability and the flow rate of working fluid.

That is, as shown in FIG. 7, at the time when the degree of instability becomes equal to or greater than a first threshold (the upper limit threshold), the machining condition changing unit 68 starts changing the flow rate to be smaller (i.e., decreasing the flow rate) every unit time until the degree of instability becomes less than a second threshold (the lower limit threshold). Specifically, the machining condition changing unit 68 changes the flow rate to be smaller in such a manner that the change ratio of the flow rate to a normal value (initial value) increases as the degree of instability is greater, and controls the pump in the dielectric fluid unit 16 so as to jet working fluid from the wire guide 32 at the changed flow rate.

In this connection, the machining condition changing unit 68 can prevent degradation of accuracy in electrical discharge machining due to increased generation of sludge at the electrode gap during electrical discharge machining, by setting a minimum value (minimum limit) for the flow rate to be changed, in advance.

On the other hand, when the degree of instability is less than the second threshold (lower limit threshold), the machining condition changing unit 68 changes the flow rate greater (i.e., increases the flow rate) every unit time until the flow rate of the working fluid returns to the normal value (initial value). Specifically, the machining condition changing unit 68 changes the flow rate greater in such a manner that the change ratio of the flow rate to the normal value (initial value) increases as the degree of instability is greater, and controls the pump in the dielectric fluid unit 16 so as to jet working fluid from the wire guide 32 at the changed flow rate.

Thus, when the flow rate of working fluid is adopted as the machining condition, it is possible to diminish breakage of wire electrode 12, similarly to the above embodiment.

Figure 8:
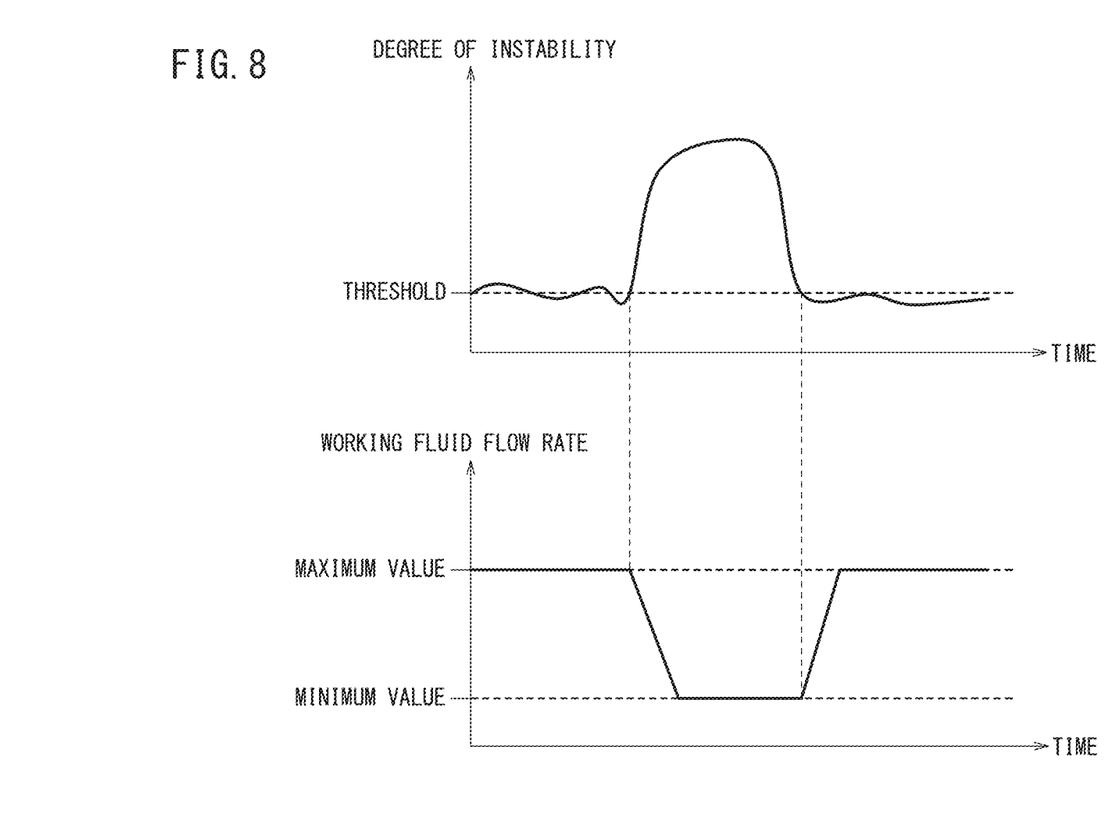
FIG. 8 is a graph showing an example of another relationship between the degree of instability and the flow rate of working fluid, different from that of FIG. 7.

As shown in FIG. 8, whether or not to change the flow rate of working fluid may be determined by using one threshold, as in Modification 1.

[Modification 3]

Though in the above embodiment, the off time is adopted as the machining condition, the tension of the wire electrode 12 may be adopted.

Specifically, the machining condition changing unit 68 can change the tension of the wire electrode as in the case where the flow rate of working fluid is changed. That is, at the time when the degree of instability becomes equal to or greater than a first threshold (the upper limit threshold), the machining condition changing unit 68 starts changing the tension of the wire electrode 12 smaller (i.e., decreasing the tension) every unit time until the degree of instability becomes less than a second threshold (the lower limit threshold). More specifically, the machining condition changing unit 68 changes the tension smaller in such a manner that the change ratio of the tension to a normal value (initial value) increases as the degree of instability is greater, and controls the torque motors 24, 40 and the brake motor 28 so as to produce the changed tension.

On the other hand, when the degree of instability is less than the second threshold (lower limit threshold), the machining condition changing unit 68 changes the tension greater (i.e., increasing the tension) every unit time until the tension of the wire electrode 12 returns to the normal value (initial value). Specifically, the machining condition changing unit 68 changes the tension greater in such a manner that the change ratio of the tension to the normal value (initial value) increases as the degree of instability is greater, and controls the torque motors 24, 40 and the brake motor 28 so as to produce the changed tension.

Thus, when the tension of the wire electrode 12 is adopted as the machining condition, it is possible to diminish breakage of wire electrode 12, similarly to the above embodiment.

As shown in FIG. 8, as in Modification 1, whether or not to change the tension of the wire electrode 12 may be determined by using one threshold.

[Modification 4]

Though in the above embodiment, the off time is adopted as the machining condition, the feed rate of the wire electrode 12 may be adopted.

Specifically, the machining condition changing unit 68 can change the feed rate as in the case where the flow rate of working fluid is changed. That is, when the degree of instability becomes equal to or greater than a first threshold (the upper limit threshold), the machining condition changing unit 68 starts changing the feed rate of the wire electrode 12 smaller (i.e., lowering the feed rate) every unit time until the degree of instability becomes less than a second threshold (the lower limit threshold). More specifically, the machining condition changing unit 68 changes the feed rate smaller (lower) in such a manner that the change ratio of the feed rate to a normal value (initial value) increases as the degree of instability is greater, and controls the torque motors 24, 40 and the brake motor 28 so as to produce the changed feed rate.

On the other hand, when the degree of instability is less than the second threshold (lower limit threshold), the machining condition changing unit 68 changes the feed rate greater (i.e., increasing the feed rate) every unit time until the feed rate of the wire electrode 12 returns to the normal value (initial value). Specifically, the machining condition changing unit 68 changes the feed rate greater (higher) in such a manner that the change ratio of the feed rate to the normal value (initial value) increases as the degree of instability is greater, and controls the torque motors 24, 40 and the brake motor 28 so as to produce the changed feed rate.

Thus, when the feed rate of the wire electrode 12 is adopted as the machining condition, it is possible to diminish breakage of wire electrode 12, similarly to the above embodiment.

As shown in FIG. 8, as in Modification 1, whether or not to change the feed rate of the wire electrode 12 may be determined by using one threshold.

[Modification 5]

The above embodiment and the above Modifications 1 to 4 may be arbitrarily combined as long as no technical inconsistency occurs.

[Technical Ideas]

Technical ideas that can be grasped from the above-described embodiment and Modifications will be described below.

The wire electrical discharge machine (10) performs electrical discharge machining on a workpiece (W) by generating electrical discharge at an electrode gap formed between the workpiece (W) and a wire electrode (12).

This wire electrical discharge machine (10) includes: a pulse detection unit (60) configured to detect pulses of voltage repeatedly applied between the workpiece (W) and the wire electrode (12); an instability calculation unit (66) configured to calculate the degree of instability indicating how unstable the discharge state is, by using the number of non-discharge pulses (P3) that present no voltage drop due to the electrical discharging, among the pulses detected per unit time by the pulse detection unit (60); and a machining condition changing unit (68) configured to change machining conditions for the workpiece, based on the calculated degree of instability.

According to the wire electrical discharge machine (10), it is possible to reduce breakage of the wire electrode (12) by changing the machining conditions based on the degree of instability calculated using the number of non-discharge pulses (P3).

The instability calculation unit (66) may be configured to calculate the degree of instability, by further using the numbers or the discharge delay times (Ta) of normal discharge pulses (P1) and abnormal discharge pulses (P2), the discharge delay time being a time from start of application of the voltage until occurrence of voltage drop due to the electrical discharge, wherein in the normal discharge pulses (P1), the discharge delay time (Ta) is equal to or longer than a predetermined time, and in the abnormal discharge pulses (P2), the discharge delay time (Ta) is less than the predetermined time. This makes it possible to accurately calculate the degree of instability of the discharge state.

The instability calculation unit (66) may be configured to calculate the degree of instability, by using the ratio of the total number of the abnormal discharge pulses (P2) and the non-discharge pulses (P3) detected per unit time, to the number of the normal discharge pulses (P1) detected per unit time. This makes it possible to accurately calculate the degree of instability of the discharge state.

The instability calculation unit (66) may be configured to calculate the degree of instability, by using the ratio of the total number of the abnormal discharge pulses (P2) and the non-discharge pulses (P3) detected per unit time, to the total number obtained by summing all the numbers of the normal discharge pulses (P1), the abnormal discharge pulses (P2) and the non-discharge pulses (P3) detected per unit time. This makes it possible to accurately calculate the degree of instability of the discharge state.

The instability calculation unit (66) may be configured to calculate the degree of instability, by using the ratio of a second total time to a first total time, the second total time being the total of the discharge delay time (Ta) of the abnormal discharge pulses (P2) and the pulse time (Tb) of the non-discharge pulses (P3), detected per unit time, the first total time being the total of the discharge delay time (Ta) of the normal discharge pulses (P1) detected per unit time. This makes it possible to accurately calculate the degree of instability of the discharge state.

The instability calculation unit (66) may be configured to calculate the degree of instability, by using the ratio of the total time of the discharge delay time (Ta) of the abnormal discharge pulses (P2) and the pulse time (Tb) of the non-discharge pulses (P3), detected per unit time, to the total time obtained by summing the discharge delay time (Ta) of the normal discharge pulses (P1), the discharge delay time (Ta) of the abnormal discharge pulses (P2) and the pulse time (Tb) of the non-discharge pulses (P3), detected per unit time. This makes it possible to accurately calculate the degree of instability of the discharge state.

The machining condition changing unit (68) may be configured to change at least one of the off time during which no voltage is applied, the flow rate of the working fluid ejected toward the electrode gap, the tension of the wire electrode (12) and the feed rate of the wire electrode (12).

When the off time is a target to be changed, the machining condition changing unit (68) may be configured to lengthen the off time if the degree of instability becomes equal to or greater than a predetermined threshold. Also, when at least one of the flow rate of the working fluid, the tension of the wire electrode (12), and the feed rate of the wire electrode (12), other than the off time, is a target to be changed, the machining condition changing unit (68) may be configured to reduce the at least one of the targets to be changed, other than the off time, if the degree of instability becomes equal to or greater than a predetermined threshold.

An electrical discharge machining method is used in a wire electrical discharge machine (10) for performing electrical discharge machining on a workpiece (W) by generating electrical discharge at an electrode gap formed between the workpiece (W) and a wire electrode (12).

This electrical discharge machining method includes: a pulse detecting step (S1) of detecting pulses of voltage repeatedly applied between the workpiece (W) and the wire electrode (12); an instability calculating step (S3) of calculating the degree of instability indicating how unstable the discharge state is, by using the number of non-discharge pulses (P3) that present no voltage drop due to the electrical discharge, among the pulses detected per unit time; and a machining condition changing step (S5, S6) of changing machining conditions for the workpiece, based on the calculated degree of instability.

According to the wire electrical discharge machining method, it is possible to reduce breakage of the wire electrode (12) by changing the machining conditions based on the degree of instability calculated using the number of non-discharge pulses (P3).

The instability calculating step (S3) may calculate the degree of instability, by further using the numbers or the discharge delay times (Ta) of normal discharge pulses and abnormal discharge pulses, the discharge delay time being a time from start of application of the voltage until occurrence of voltage drop due to the electrical discharge, wherein in the normal discharge pulses (P1), the discharge delay time (Ta) is equal to or longer than a predetermined time, and in the abnormal discharge pulses (P2), the discharge delay time (Ta) is less than the predetermined time. This method makes it possible to accurately calculate the degree of instability of the discharge state.

The instability calculating step (S3) may calculate the degree of instability, by using the ratio of the total number of the abnormal discharge pulses (P2) and the non-discharge pulses (P3) detected per unit time, to the number of the normal discharge pulses (P1) detected per unit time. This method makes it possible to accurately calculate the degree of instability of the discharge state.

The instability calculating step (S3) may calculate the degree of instability, by using the ratio of the total number of the abnormal discharge pulses (P2) and the non-discharge pulses (P3) detected per unit time, to the total number obtained by summing all the numbers of the normal discharge pulses (P1), the abnormal discharge pulses (P2) and the non-discharge pulses (P3) detected per unit time. This method makes it possible to accurately calculate the degree of instability of the discharge state.

The instability calculating step (S3) may calculate the degree of instability, by using the ratio of a second total time to a first total time, the second total time being the total of the discharge delay time (Ta) of the abnormal discharge pulses (P2) and the pulse time (Tb) of the non-discharge pulses (P3), detected per unit time, the first total time being the total of the discharge delay time (Ta) of the normal discharge pulses (P1) detected per unit time. This method makes it possible to accurately calculate the degree of instability of the discharge state.

The instability calculating step (S3) may calculate the degree of instability, by using the ratio of the total time of the discharge delay time (Ta) of the abnormal discharge pulses (P2) and the pulse time (Tb) of the non-discharge pulses (P3), detected per unit time, to the total time obtained by summing the discharge delay time (Ta) of the normal discharge pulses (P1), the discharge delay time (Ta) of the abnormal discharge pulses (P2) and the pulse time (Tb) of the non-discharge pulses (P3), detected per unit time. This method makes it possible to accurately calculate the degree of instability of the discharge state.

The machining condition changing step (S5, S6) may change at least one of the off time during which no voltage is applied, the flow rate of the working fluid ejected toward the electrode gap, the tension of the wire electrode (12), and the feed rate of the wire electrode (12).

What is claimed is:

1. A wire electrical discharge machine for performing electrical discharge machining on a workpiece by generating electrical discharge at an electrode gap formed between the workpiece and a wire electrode, comprising:
   a pulse detection unit configured to detect per unit of time normal discharge pulses, abnormal discharge pulses, and non-discharge pulses of voltage repeatedly applied between the workpiece and the wire electrode wherein the normal and abnormal discharge pulses present voltage drops due to electrical discharge and the non-discharge pulses present no voltage drop due to electrical discharge;
   an instability calculation unit configured to calculate a degree of instability indicating how unstable a discharge state is, by using a number of the normal discharge pulses, the abnormal discharge pulses, and the non-discharge pulses detected by the pulse detection unit; and
   a machining condition changing unit configured to change a machining condition for the workpiece, based on the calculated degree of instability.

2. The wire electrical discharge machine according to claim 1, wherein the instability calculation unit is configured to calculate the degree of instability, by further using numbers or discharge delay times of normal discharge pulses and abnormal discharge pulses, the discharge delay time being a time from start of application of the voltage until occurrence of voltage drop due to the electrical discharge, wherein in the normal discharge pulses, the discharge delay time is equal to or longer than a predetermined time, and in the abnormal discharge pulses, the discharge delay time is less than the predetermined time.

3. The wire electrical discharge machine according to claim 2, wherein the instability calculation unit is configured to calculate the degree of instability, by using a ratio of total number of the abnormal discharge pulses and the non-discharge pulses detected per unit time, to the number of the normal discharge pulses detected per unit time.

4. The wire electrical discharge machine according to claim 2, wherein the instability calculation unit is configured to calculate the degree of instability, by using a ratio of total number of the abnormal discharge pulses and the non-discharge pulses detected per unit time, to total number obtained by summing all the numbers of the normal discharge pulses, the abnormal discharge pulses and the non-discharge pulses detected per unit time.

5. The wire electrical discharge machine according to claim 2, wherein the instability calculation unit is configured to calculate the degree of instability, by using a ratio of a second total time to a first total time, the second total time being a total of the discharge delay time of the abnormal discharge pulses and pulse time of the non-discharge pulses, detected per unit time, the first total time being a total of the discharge delay time of the normal discharge pulses detected per unit time.

6. The wire electrical discharge machine according to claim 2, wherein the instability calculation unit is configured to calculate the degree of instability, by using a ratio of total time of the discharge delay time of the abnormal discharge pulses and pulse time of the non-discharge pulses, detected per unit time, to total time obtained by summing the discharge delay time of the normal discharge pulses, the discharge delay time of the abnormal discharge pulses and pulse time of the non-discharge pulses, detected per unit time.

7. The wire electrical discharge machine according to claim 1, wherein the machining condition changing unit is configured to change at least one of an off time during which no voltage is applied, a flow rate of working fluid ejected toward the electrode gap, a tension of the wire electrode, and a feed rate of the wire electrode.

8. The wire electrical discharge machine according to claim 7, wherein:
   when the off time is a target to be changed, the machining condition changing unit is configured to lengthen the off time if the degree of instability becomes equal to or greater than a predetermined threshold; and
   when at least one of the flow rate of the working fluid, the tension of the wire electrode, and the feed rate of the wire electrode, other than the off time, is a target to be changed, the machining condition changing unit is configured to reduce the at least one of the targets to be changed, other than the off time, if the degree of instability becomes equal to or greater than a predetermined threshold.

9. An electrical discharge machining method used in a wire electrical discharge machine for performing electrical discharge machining on a workpiece by generating electrical discharge at an electrode gap formed between the workpiece and a wire electrode, comprising:
   a pulse detecting step of detecting pulses per unit of time normal discharge pulses, abnormal discharge pulses and non-discharge pulses of voltage repeatedly applied between the workpiece and the wire electrode, wherein the normal and abnormal discharge pulses present voltage drops due to electrical discharge and the non-discharge pulses present no voltage drop due to electrical discharge;
   an instability calculating step of calculating a degree of instability indicating how unstable a discharge state is, by using a number of the normal discharge pulses, the abnormal discharge pulses and the non-discharge pulses detected; and
   a machining condition changing step of changing a machining condition for the workpiece, based on the calculated degree of instability.

10. The electrical discharge machining method according to claim 9, wherein the instability calculating step calculates the degree of instability, by further using numbers or discharge delay times of normal discharge pulses and abnormal discharge pulses, the discharge delay time being a time from start of application of the voltage until occurrence of voltage drop due to the electrical discharge, wherein in the normal discharge pulses, the discharge delay time is equal to or longer than a predetermined time, and in the abnormal discharge pulses, the discharge delay time is less than the predetermined time.

11. The electrical discharge machining method according to claim 10, wherein the instability calculating step calculates the degree of instability, by using a ratio of total number of the abnormal discharge pulses and the non-discharge pulses detected per unit time, to the number of the normal discharge pulses detected per unit time.

12. The electrical discharge machining method according to claim 10, wherein the instability calculating step calculates the degree of instability, by using a ratio of total number of the abnormal discharge pulses and the non-discharge pulses detected per unit time, to total number obtained by summing all the numbers of the normal discharge pulses, the abnormal discharge pulses and the non-discharge pulses detected per unit time.

13. The electrical discharge machining method according to claim 10, wherein the instability calculating step calculates the degree of instability, by using a ratio of a second total time to a first total time, the second total time being a total of the discharge delay time of the abnormal discharge pulses and pulse time of the non-discharge pulses, detected per unit time, the first total time being a total of the discharge delay time of the normal discharge pulses detected per unit time.

14. The electrical discharge machining method according to claim 10, wherein the instability calculating step calculates the degree of instability, by using a ratio of total time of the discharge delay time of the abnormal discharge pulses and pulse time of the non-discharge pulses, detected per unit time, to total time obtained by summing the discharge delay time of the normal discharge pulses, the discharge delay time of the abnormal discharge pulses and pulse time of the non-discharge pulses, detected per unit time.

15. The electrical discharge machining method according to claim 9, wherein the machining condition changing step changes at least one of an off time during which no voltage is applied, a flow rate of working fluid ejected toward the electrode gap, a tension of the wire electrode, and a feed rate of the wire electrode.

* * * * *